United States Patent
Grandidge et al.

(10) Patent No.: US 11,714,236 B2
(45) Date of Patent: Aug. 1, 2023

(54) SINGLE-STATION SPLICING UNIT AND METHOD

(71) Applicant: Ortronics, Inc., New London, CT (US)

(72) Inventors: Ryan J. Grandidge, Wakefield, RI (US); Daniel M. Smith, Westerly, RI (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 17/523,353

(22) Filed: Nov. 10, 2021

(65) Prior Publication Data
US 2022/0146750 A1 May 12, 2022

Related U.S. Application Data

(60) Provisional application No. 63/113,061, filed on Nov. 12, 2020.

(51) Int. Cl.
*G02B 6/255* (2006.01)
(52) U.S. Cl.
CPC ......... *G02B 6/2553* (2013.01); *G02B 6/2551* (2013.01); *G02B 6/2556* (2013.01)
(58) Field of Classification Search
CPC ... G02B 6/2556; G02B 6/2557; G02B 6/3805
See application file for complete search history.

(56) References Cited

U.S. PATENT DOCUMENTS

| | | | |
|---|---|---|---|
| 4,199,223 A | 4/1980 | Yannoni | |
| 5,675,681 A * | 10/1997 | Chiaretti | G02B 6/3877 |
| | | | 385/59 |
| 5,717,813 A | 2/1998 | Harmon et al. | |
| 8,401,356 B2 * | 3/2013 | Nishioka | G02B 6/3898 |
| | | | 385/134 |
| 8,920,049 B2 | 12/2014 | Grandidge | |
| 2005/0191014 A1 * | 9/2005 | Renfro, Jr. | G02B 6/2558 |
| | | | 385/55 |
| 2017/0242193 A1 | 8/2017 | Akiyama et al. | |
| 2020/0319407 A1 | 10/2020 | Lee et al. | |

FOREIGN PATENT DOCUMENTS

| | | |
|---|---|---|
| EP | 1752804 A1 | 2/2007 |
| EP | 21207780.4 | 11/2021 |

OTHER PUBLICATIONS

Extended European Search Report dated Mar. 21, 2022 for European Patent Application 21207780.4-1001.
U.S. Appl. No. 63/113,061, filed Nov. 12, 2020.

* cited by examiner

*Primary Examiner* — Omar R Rojas
(74) *Attorney, Agent, or Firm* — McCarter & English, LLP (57) ABSTRACT

An example single-station splicing unit is provided that includes a housing, an alignment element, a first electrode, and a second electrode. The housing includes an interior space and at least one cover configured to be interlocked with the housing to enclose the interior space. The alignment element is disposed within the interior space of the housing. The first electrode is disposed on one side of the housing, and the second electrode is disposed in the housing on an opposing side from the first electrode and in a facing relationship with the first electrode. The housing is configured to receive fibers in an opposing and abutting relationship to splice the fibers, and the housing remains secured to the fibers after splicing.

23 Claims, 5 Drawing Sheets

SINGLE-STATION SPLICING UNIT AND METHOD

CROSS-REFERENCE TO RELATED APPLICATIONS

This application claims the benefit of commonly assigned U.S. Provisional Patent Application No. 63/113,061, which was filed on Nov. 12, 2020. The entire content of the foregoing provisional application is incorporated herein by reference.

BACKGROUND

In the fiber optic industry, fusion splicing can be used to fuse or weld two fiber ends together. Traditional fusion splicing generally involves the use of a high-precision, high-maintenance, two-station fusion splicer to create an electric arc that creates a reliable joint between the two fiber ends. The fusion splicing process generally involves the steps of aligning the cleaved fiber ends, generating and controlling a high-voltage arc to melt the fiber ends together, and providing mechanical protection to the completed splice.

Alignment of the cleaved fiber ends and using the electric arc to melt the fiber ends together is typically performed in a main station of the fusion splicer. Providing mechanical protection to the completed splice is generally performed by means of a consumable, heat-shrinkable protective sleeve that must slid over the splice by the user and fixed in position in the splicer's secondary station (e.g., a small oven) to shrink the protective sleeve over the splice. The protective sleeve generally includes a heat shrink tubing, a hot melt glue tube through which the spliced fiber is routed, and a rigid strength member (e.g., a metal rod or formed ceramic).

The protective sleeve must be fed onto one of the fiber ends prior to splicing, and operators occasionally forget to do so. If the protective sleeve is not positioned on the fiber end prior to splicing, once the fibers are spliced, the only option is to break the splice and start over. In addition, the completed splice must be handled carefully when it is removed from the main station of the fusion splicer, covered over by the protective sleeve, then placed inside the secondary station to apply the protective sleeve. Damage to the splice can occur during the delicate transfer of the spliced fibers between the main and secondary stations. A high level of skill and experience is therefore generally needed to splice fibers.

Traditional fusion splicers can also be expensive due to their high precision, and may necessitate constant cleaning and regular maintenance in the form of arc calibration and periodic replacement of the tungsten electrodes. The electrodes can wear down after approximately 1,000 cycles because the high-voltage arc formed during splicing can blast away a small amount of material with each discharge, gradually reducing the sharpness of the electrode point, and reducing the accuracy of the arc path within the splicing chamber. Although tungsten provides a high melting and boiling point for the electrodes, lasting longer than other metals, the expensive nature of tungsten results in an added expense to electrode replacement.

SUMMARY

Embodiments of the present disclosure provide an exemplary single-station splicing unit that allows for precise and cost-efficient fiber splicing. The splicing unit includes a housing and an alignment element disposed within the housing. The alignment element assists with precisely aligning the fiber ends prior to fixedly clamping the fibers within the housing. The splicing unit includes a pair of electrodes disposed within the housing that creates the high-voltage arc to splice the fiber ends when the splicing unit is placed within a fusion splicer. The housing remains on the fibers after using the fusion splicer to protect the spliced fibers without the need for an oven station or a protective sleeve. The housing covers the completed splice after use, and clamps to the fiber coating and/or buffer. The combination of the housing and the mechanical rigidity of the alignment element prevents flexural loads on the housing from being transmitted to the splice. The splicing unit therefore provides a single-station fusion splicing process by performing the splice inside of a protective housing or consumable unit, significantly simplifying the splicing process and preventing or reducing potential mistakes by the operator.

In accordance with embodiments of the present disclosure, an exemplary splicing unit is provided. The splicing unit includes a housing, an alignment element, and first and second electrodes. The housing includes an interior space and at least one cover configured to be interlocked with the housing to enclose the interior space. The alignment element is disposed within the interior space of the housing. The first electrode is disposed on one side of the housing. The second electrode is disposed in the housing on an opposing side from the first electrode and in a facing relationship with the first electrode. The housing is configured to receive fibers in an opposing and abutting relationship to splice the fibers, and the housing remains secured to the fibers after splicing.

The housing can include alignment protrusions extending from a bottom surface of the housing. The alignment element can include complementary notches configured to engage with the alignment protrusions of the housing to orient the alignment element within the housing. The housing can include first and second upwardly directed extensions protruding from a bottom surface of the housing, the upwardly directed extensions configured to support a coated section of the respective fibers. As discussed herein, "coated section" refers to a coated and/or a buffered section of the fiber. An uppermost point of each of the first and second upwardly directed extensions can include a groove formed therein and extending the length of the first and second upwardly directed extensions. The groove can be configured complementary to an outer diameter of the coated section of the respective fibers.

In some embodiments, the at least one cover can include first and second covers configured to close over and crimp a coated section of the respective fibers at proximal and distal ends of the housing. In some embodiments, the at least one cover can include a third cover disposed between the first and second covers, the third cover configured to close over and seat an exposed section of the respective fibers within a groove formed in the alignment element. Each of the first, second and third covers can be pivotably connected to a main body section of the housing with a respective hinge.

First and second outer walls of the housing can include a slot formed therein, the slots configured to slidably receive the respective first and second electrodes. Each slot includes a first opening facing outwardly away from the interior space of the housing, and a second opening facing inwardly towards the interior space. A body of the first and second electrodes can be exposed through the first opening formed in the slots of the housing for electrical contact with contacts of a fusion splicer. A pointed extension of the first and second electrodes can extend into the interior space of the housing through the second opening formed in the slots of the housing.

The alignment element can include an elongated body with a notched area creating a space aligned with a position of the first and second electrodes. The alignment element can include a top surface with a groove formed therein, the groove configured to receive exposed sections of the fibers. Ends of the exposed sections of the fibers can be configured to be positioned in an abutting relationship in the notched area of the alignment element. The at least one cover can include an extension complementary to the groove formed in the top surface of the alignment element, the extension configured to seat the exposed sections of the fibers within the groove of the alignment element.

In accordance with embodiments of the present disclosure, an exemplary splicing system is provided. The splicing system includes a fusion splicer and a splicing unit configured to be positioned within the fusion splicer. The splicing unit includes a housing, an alignment element, and first and second electrodes. The housing includes an interior space and at least one cover configured to be interlocked with the housing to enclose the interior space. The alignment element is disposed within the interior space of the housing. The first electrode is disposed on one side of the housing. The second electrode is disposed in the housing on an opposing side from the first electrode and in a facing relationship with the first electrode. The housing is configured to receive fibers in an opposing and abutting relationship to splice the fibers, and the housing remains secured to the fibers after splicing. The fusion splicer can include a cradle configured to receive the splicing unit. The fusion splicer can include electrical contacts configured to electrically connect with the first and second electrodes of the splicing unit.

In accordance with embodiments of the present disclosure, an exemplary method of fusion splicing optical fibers is provided. The method includes positioning a first fiber and a second fiber in an opposing and facing relationship within an interior space of a housing of a splicing unit. Each of the first and second fibers includes a coated section and an exposed section. The splicing unit includes an alignment element disposed within the interior space, and first and second electrodes disposed on opposing sides of the housing. The method includes positioning ends of the exposed sections of the first and second fibers in an abutting relationship. The method includes interlocking a cover with the housing to enclose the exposed section of the first and second fibers within the interior space of the housing and to maintain the position of the first and second fibers within the housing. The method includes creating a voltage arc between the first and second electrodes to splice the ends of the exposed sections of the first and second fibers. The housing remains secured to the first and second fibers after splicing.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the single-station splicing unit, reference is made to the accompanying figures, wherein.

DETAILED DESCRIPTION

Figure 1:
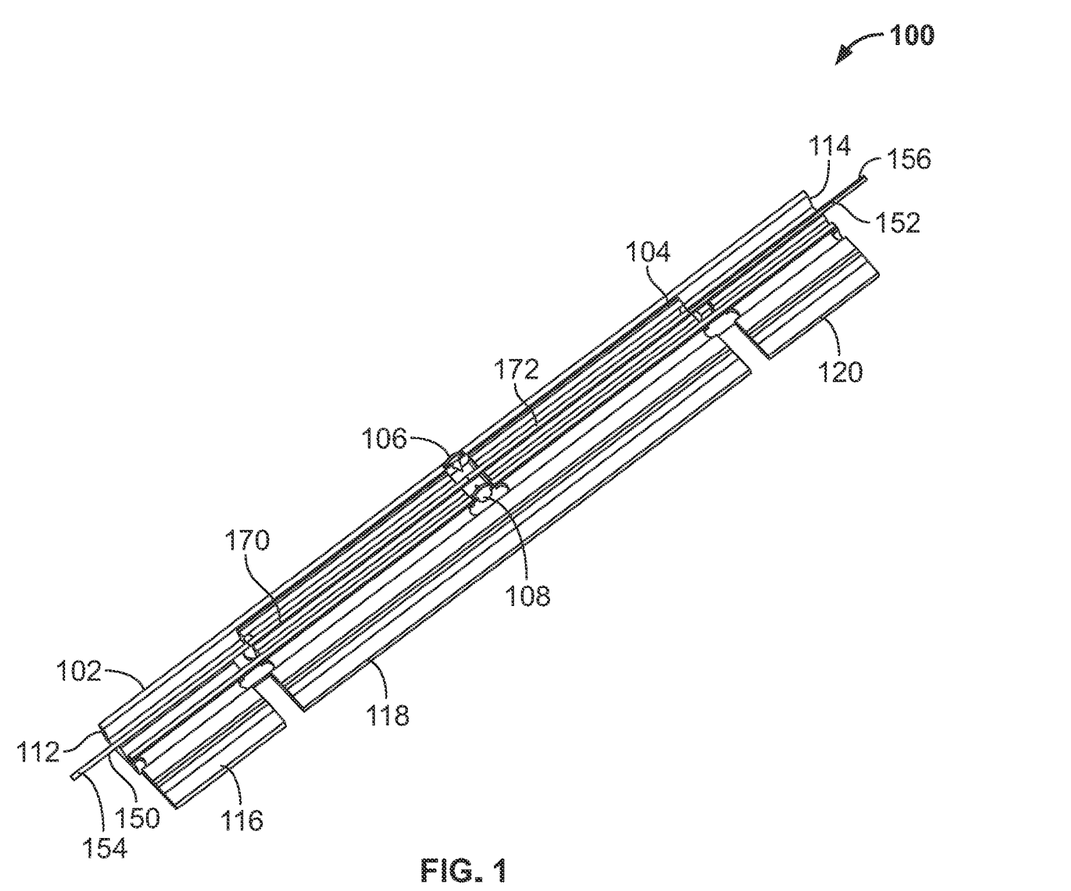
FIG. 1 is a perspective view of a single-station splicing unit in an exemplary embodiment including two fiber optic ends prior to splicing.
Figure 2:
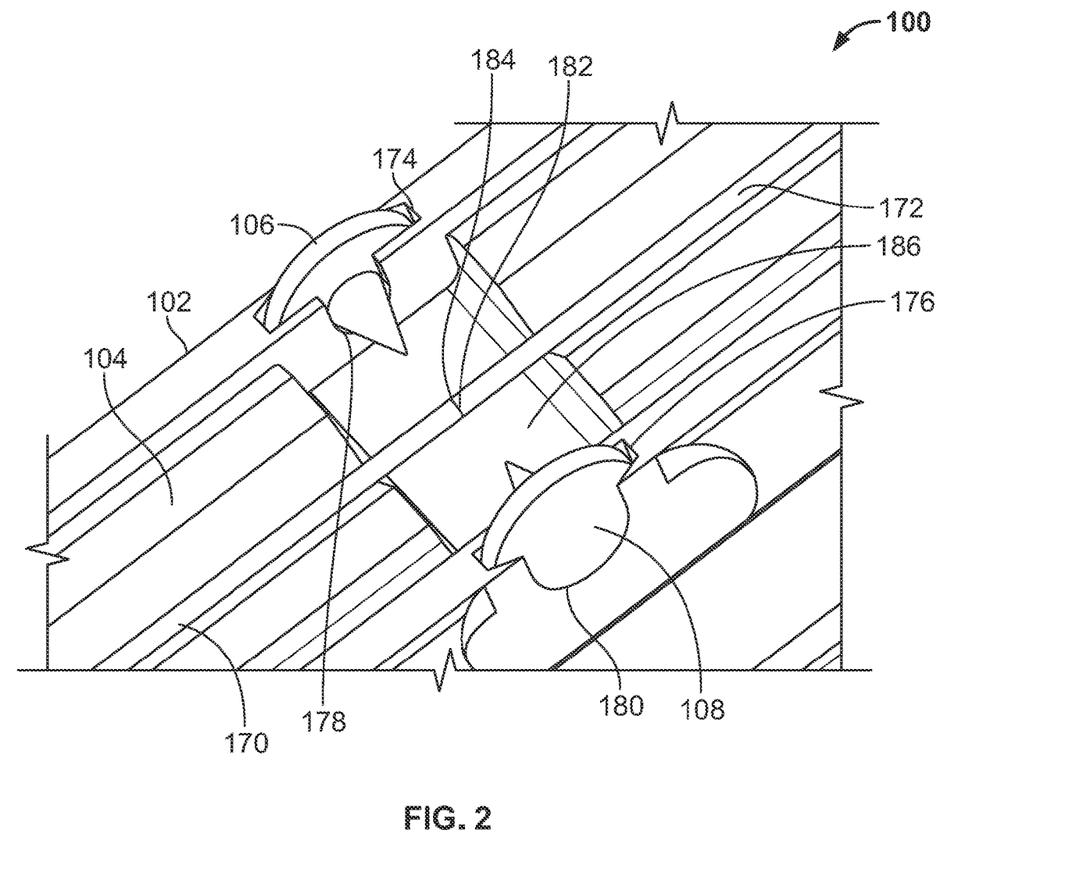
FIG. 2 is a detailed view of a region of the single-station splicing unit of FIG. 1 where splicing occurs.

FIGS. 1-2 are perspective and detailed views of an exemplary single-station splicing unit 100 (hereinafter "splicing unit 100") of the present disclosure. The splicing unit 100 includes a housing 102, an alignment element 104 disposed within the housing 102, and electrodes 106, 108 forming an electrode pair disposed within the housing 102. The components of the splicing unit 100 allow for the entire splicing process to take place in a single station. In particular, the splicing unit 100 can be placed within a cradle of a fusion splicer such that electrical contacts (e.g., wiping contacts) of the fusion splicer touch and make an electrical connection with the electrodes 106, 108 on opposing sides of the splicing unit 100 to generate the high-voltage arc within the splicing unit 100. The high-voltage arc splices the fiber ends within the housing 102, and the housing 102 remains permanently fixed to the fibers to act as a protective layer to the splice. The splicing process is thereby significantly simplified and reduces the potential for damage to the splice.

Figure 3:
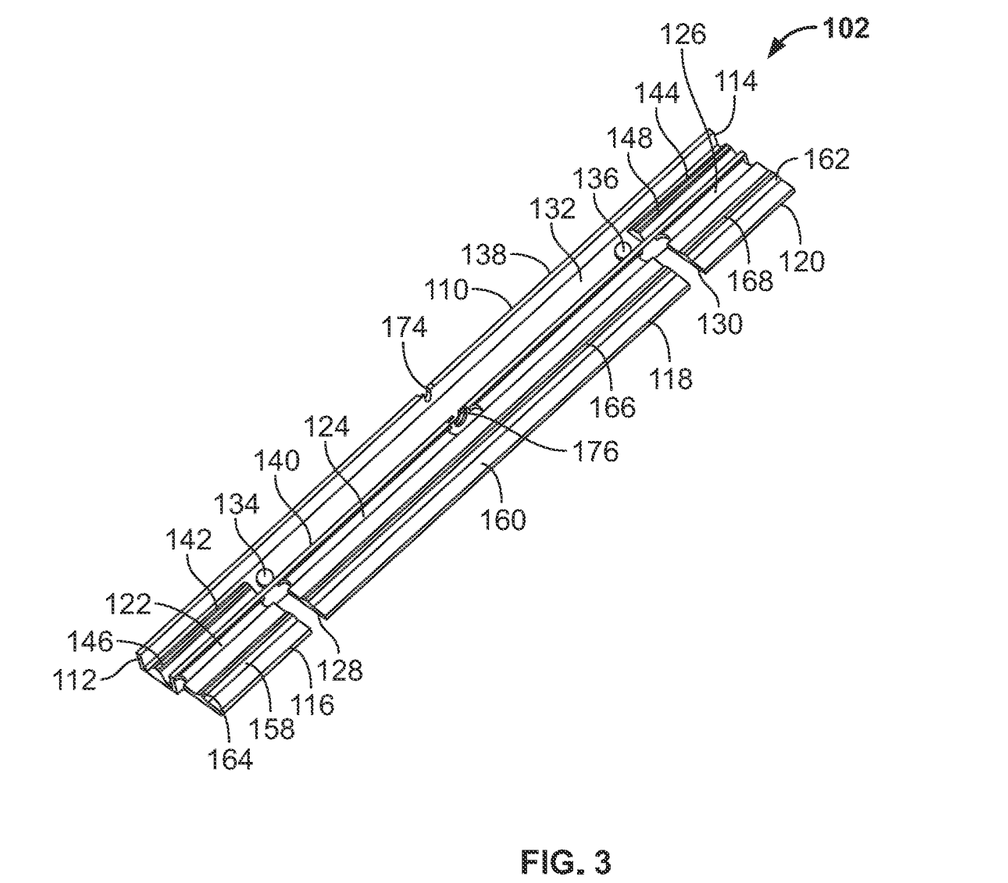
FIG. 3 is a perspective view of a housing of the single-station splicing unit of FIG. 1.

The housing 102 can be fabricated from a molded plastic (e.g., polypropylene, or the like) to provide protection to the completed splice, while permitting flexibility in the necessary areas for using the splicing unit 100. With reference to FIGS. 1-3, the housing 102 includes a main body section 110 (e.g., a base) defining an elongated structure extending between opposing proximal and distal ends 112, 114. The housing 102 includes three covers 116, 118, 120 each pivotably connected to the main body section 110 by respective living hinges 122, 124, 126. The covers 116, 118 can be separated from each other by a gap 128, and the covers 118, 120 can be separated from each other by a gap 130. Each of the covers 116, 118, 120 is therefore capable of being pivoted relative to the main body section 110 independently from the other covers 116, 118, 120. The material of the housing 102 allows for flexing of the hinges 122, 124, 126 during operation of the covers 116, 118, 120. The covers 116, 118, 120 are configured to interlock with an outer wall 138 of the main body section 110 to enclose the interior space of the main body section 110. For example, the main body section 110 can include a groove into which the covers 116, 118, 120 can be snapped into to maintain the closed position of the covers 116, 118, 120.

The main body section 110 includes a hollow interior with a substantially planar or flat bottom surface 132 at the center of the main body section 110. Outer walls 138, 140 extend substantially perpendicularly on opposing sides of the bottom surface 132. The main body section 110 includes two protrusions 134, 136 extending substantially perpendicularly from the bottom surface 132. The protrusions 134, 136 are spaced from each other and can include a rounded top surface. In some embodiments, the protrusions 134, 136 can be disposed near the gaps 128, 130. The protrusions 134, 136 can assist in aligning and maintaining the position of the alignment element 104 when the alignment element 104 is positioned within the housing 102 by insertion of the protrusions 134, 136 into complementary openings or notches formed in the alignment element 104.

The main body section 110 includes upwardly directed extensions 142, 144 extending from the bottom surface 132 on opposing sides of the main body section 110. The extension 142 can extend from the bottom surface 132 at or near the protrusion 134 and up to the proximal end 112, and the extension 144 can extend from the bottom surface 132 at or near the protrusion 136 and up to the distal end 114. Each extension 142, 144 can define a substantially V-shaped configuration. In some embodiments, the uppermost point of the extensions 142, 144 can define a U-shaped groove 146, 148 configured and dimensioned to receive or cradle the coated section 150, 152 of the respective fibers 154, 156.

Each of the covers 116, 118, 120 can define a substantially planar configuration and includes an extension 158, 160, 162 extending substantially perpendicularly from the inner surface of the respective cover 116, 118, 120. The extensions 158, 160, 162 can be oriented substantially parallel to a longitudinal axis passing along the length of the housing 102. The extension 158 can extend from and between the outer proximal and distal edges of the cover 116, the extension 160 can extend from and between the outer proximal and distal edges of the cover 118, and the extension 162 can extend from and between the outer proximal and distal edges of the cover 120. Each extension 158, 160, 162 can define a substantially V-shaped configuration, with the uppermost point of the extensions 158, 160, 162 defining a U-shaped groove 164, 166, 168.

The grooves 164, 168 can be complementary to the grooves 146, 148 such that when the covers 116, 120 are closed over the main body section 110, the grooves 146, 148, 164, 168 can substantially surround and crimp opposing sides of the coated section 150, 152 of the respective fibers 154, 156 to maintain the position of the fibers 154, 156 relative to the housing 102. When the central cover 118 is closed over the main body section 110, the groove 166 can at least partially receive and impart downward pressure on the exposed glass section 170, 172 of the respective fibers 154, 156 to ensure the exposed glass sections 170, 172 are properly aligned and seated within the alignment element 104.

The housing 102 includes two downwardly directed slots 174, 176 formed in the outer walls 138, 140 on opposing sides of the main body section 110. The slots 174, 176 can be substantially centrally positioned between the proximal and distal ends 112, 114, and are configured and dimensioned to at least partially receive the respective electrodes 106, 108. In some embodiments, the depth of the slots 174, 176 can be dimensioned to partially receive the respective electrodes 106, 108, such that at least a portion of the electrodes 106, 108 extends above the top surface of the main body section 110 (see, e.g., FIG. 2).

In some embodiments, the depth of the slots 174, 176 can be dimensioned to completely receive the respective electrodes 106, 108 such that the electrodes 106, 108 do not extend above the plane defined by the top surface of the main body section 110 (e.g., the electrodes 106, 108 are aligned with the top surface of the main body section 110, the electrodes 106, 108 are disposed below the top surface of the main body section 110, or the like). The depth of the slots 174, 176 can be selected to ensure alignment of the electrodes 106, 108 with the ends 182, 184 of the fibers 154, 156. The housing 102 includes a U-shaped cutout 178 (e.g., opening) at each inner surface of the outer walls 138, 140 and extending into the hollow space formed by the slots 174, 176, and a U-shaped cutout 180 (e.g., opening) at each outer surface of the outer walls 138, 140 and extending into the hollow space formed by the slots 174, 176.

The U-shaped cutout 180 can be dimensioned generally greater than the U-shaped cutout 178. For example, the width of the U-shaped cutout 180 can be dimensioned greater than the width U-shaped cutout 178 to provide a greater exposed surface area of the electrodes 106, 108 at the outer surfaces. In some embodiments, the height of the U-shaped cutouts 178, 180 can be substantially equal. In some embodiments, the height of the U-shaped cutout 180 can be dimensioned greater than the height of the U-shaped cutout 178. The greater exposed surface area of the electrodes 106, 108 at the outer surfaces ensures reliable electrical contact with corresponding contacts of the fusion splicer.

Figure 4:
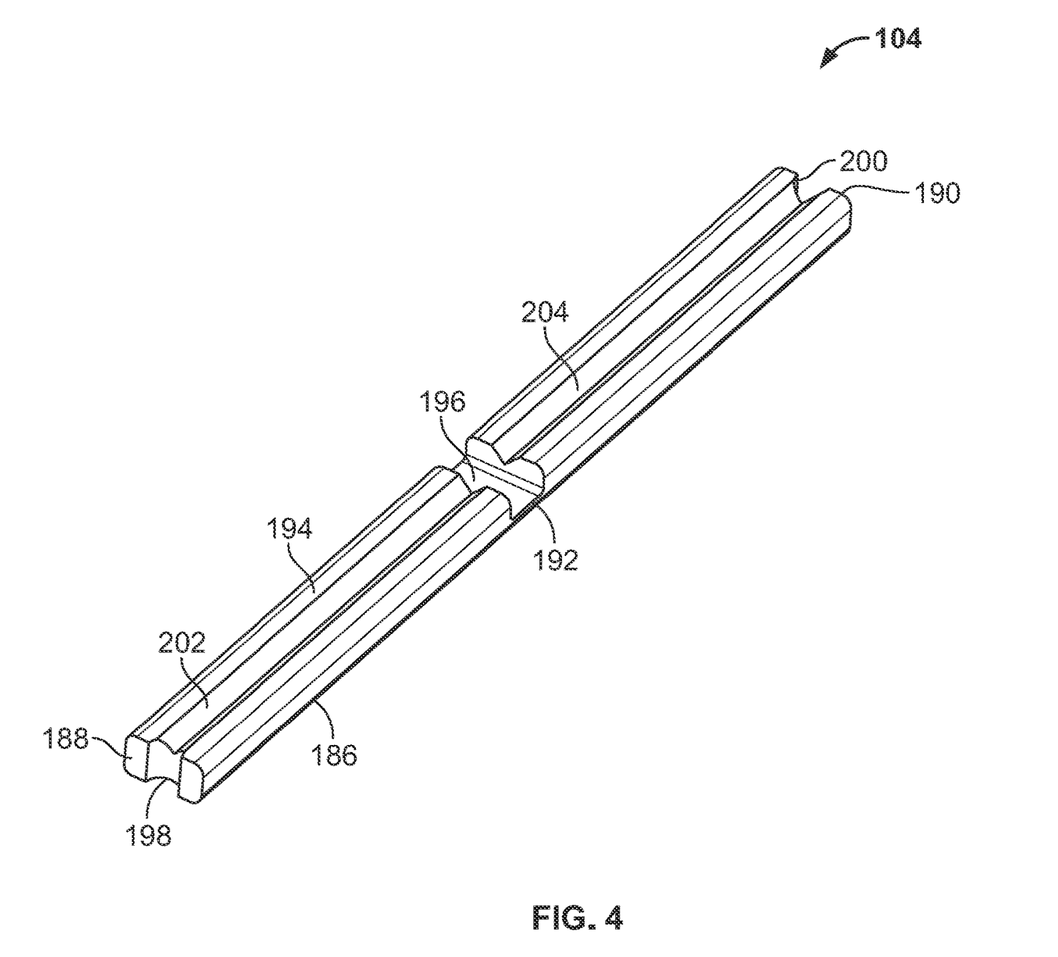
FIG. 4 is a perspective view of an alignment element of the single-station splicing unit of FIG. 1.

With reference to FIGS. 1, 2 and 4, the alignment element 104 can be fabricated from a molded zirconia ceramic or a similar micron-precision material. The material of fabrication can provide mechanical rigidity to the structure supporting the fibers 154, 156, and allows for a high precision alignment product at a low cost for high volume production. The alignment element 104 includes an elongated body 186 extending between proximal and distal ends 188, 190. The body 186 includes a substantially flat bottom surface 192 and a substantially flat top surface 194.

The alignment element 104 includes a notched area 196 (e.g., a horizontally oriented cutout) at a central section of the body 186. The notched area 196 creates a gap or separation between two sections of the body 186. As illustrated in FIGS. 1 and 2, the notched area 196 aligns with the electrodes 106, 108 to define a space for creating the fusion arc for splicing the fibers 154, 156. The proximal and distal ends 188, 190 each include a notch 198, 200 (e.g., a vertically oriented cutout) along the height of the alignment element 104. In some embodiments, the notch 198, 200 can define a U-shaped configuration. The diameter associated with the notch 198, 200 is complementary to the protrusions 134, 136 of the housing 102, such that when the alignment element 104 is positioned onto the bottom surface 132 of the housing 102, the protrusions 134, 136 at least partially enter the notches 198, 200. The combination of protrusions 134, 136 and notches 198, 200 therefore acts as an alignment feature to ensure the proper, centralized position of the alignment element 104 within the housing 102.

Each of the body 186 halves includes a substantially V-shaped, inwardly directed groove 202, 204 extending the length of the body 186. The bottom of the grooves 202, 204 can be dimensioned to precisely align the outer cladding diameter of the exposed sections 170, 172 of the fibers 154, 156. The groove 202 extends from and between the proximal end 188 to the notched area 196, and the groove 204 extends from and between the notched area 196 and the distal end 190.

Figure 5:
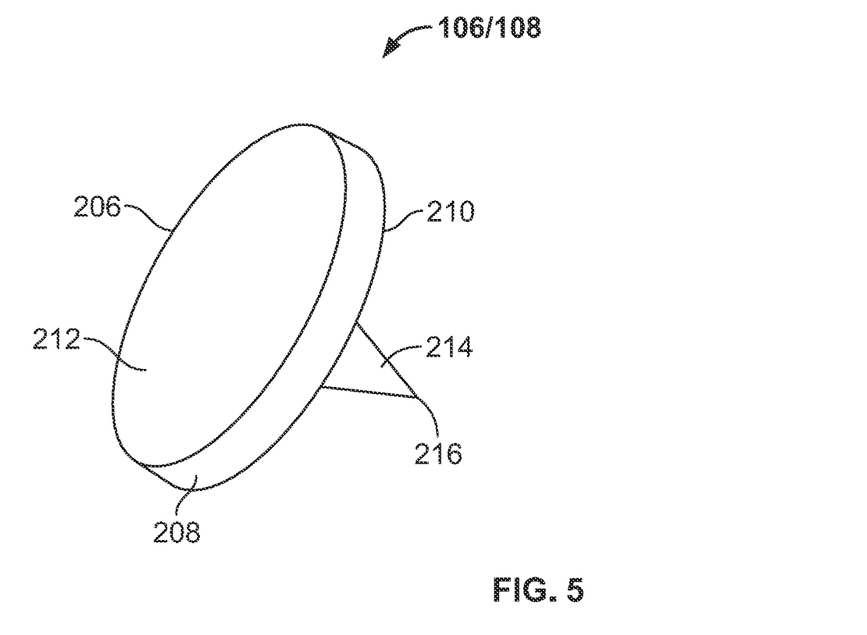
FIG. 5 is a rear perspective view of an electrode of the single-station splicing unit of FIG. 1.
Figure 6:
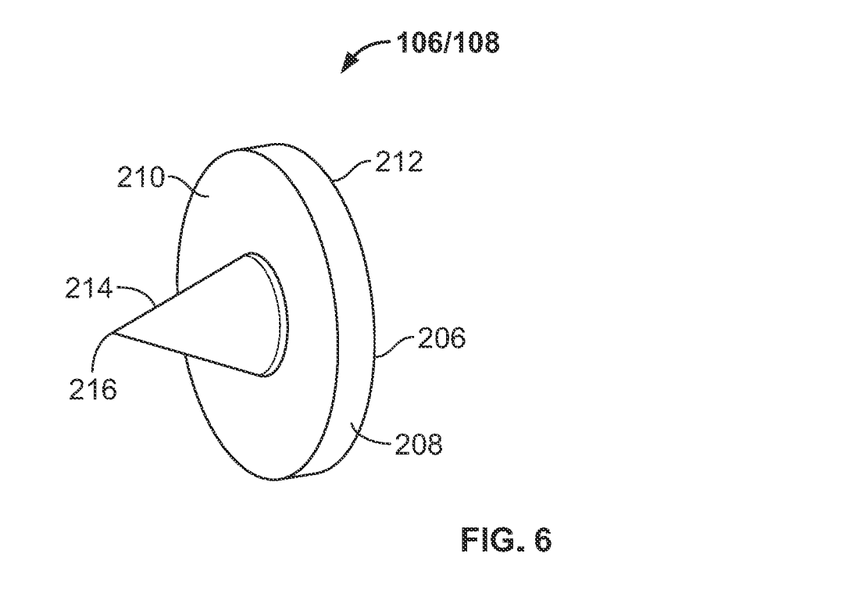
FIG. 6 is a front perspective view of an electrode of the single-station splicing unit of FIG. 1.

With reference to FIGS. 5 and 6, each of the electrodes 106, 108 can be fabricated from a metal, such as tungsten. In some embodiments, a lower cost alternative metal to tungsten can be used to fabricate the electrodes 106, 108 without a loss of performance due to the small number of discharge cycles for each electrode 106, 108. In some embodiments, base metals with a refractory metal plating (such as chromium) can be used to fabricate the electrodes 106, 108. In some embodiments, the electrodes 106, 108 can be machined, stamped, drawn, cast, or the like, depending on application demands.

Each electrode 106, 108 includes a body 206 defining a substantially cylindrical configuration with a rounded perimeter edge 208 and substantially flat front and rear surfaces 210, 212. In some embodiments, the body 206 can define a square or rectangular configuration. The dimensions and/or configuration of the body 206 are complementary to the slot 174, 176 formed in the housing 102 such that the electrodes 106, 108 can be slid into the respective slots 174, 176. Each electrode 106, 108 includes a cone-shaped extension 214 protruding from a central portion of the front surface 210, each extension 214 having a tip 216 at the distal end. The sharp tip 216 allows for accurate control of the high-voltage arc formation and location. The larger surface area of the body 206 (as compared to the extension 214) creates a broad outer surface for wiping contact with the fusion splicer.

During use, as shown in FIGS. 1 and 2, the coated sections 150, 152 of the fibers 154, 156 are positioned on the grooves 146, 148 of the housing 102. The fibers 154, 156 can be slid towards each other until the ends 182, 184 abut each other with the exposed sections 170, 172 supported in the grooves 202, 204 of the alignment element 104. Such alignment can be performed by the fusion splicer. Therefore, the fusion splicer only needs to control the longitudinal placement of the fibers 154, 156 within the splicing unit 100, necessitating only 1-axis control (as compared to traditional methods generally necessitating 3-axis control). The grooves 202, 204 receive and support the exposed sections 170, 172 of the fibers 154, 150 such that the ends 182, 184 are suspended within the notched area 196 in an abutting relationship. Once the ends 182, 184 are aligned relative to each other, the covers 116, 120 can be rotated into the closed position to crimp the coated sections 150, 152 between the extensions 142, 144 and the extensions 158, 162 to stabilize the position of the fibers 154, 156. The cover 118 can subsequently be rotated into the closed position to secure the exposed sections 170, 172 within the grooves 202, 204 by the extension 160. The configuration of the extension 160 is complementary to the V-shaped grooves 202, 204 to ensure proper alignment and seating of the exposed sections 170, 172 within the grooves 202, 204.

After the cover 118 has been closed and the fibers 154, 156 are locked in the desired position, the splicing unit 100 can be positioned within the supporting cradle of the fusion splicer. The fusion splicer can be actuated to make electrical contact against the electrodes 106, 108 to create the high-voltage arc within the housing 102. The high-voltage arc resulting in splicing of the ends 182, 182 of the fibers 154, 156. After splicing, the covers 116, 120 can be closed to clamp down on and secure the fibers 154, 156 within the housing 102. In some embodiments, closing of the covers 116, 120 can be performed manually by the operator. In some embodiments, the fusion splicer can automatically close the covers 116, 120 after completing the splicer. The housing 102 acts as the protective sleeve for the spliced fibers 154, 156 and remains permanently attached to the fibers 154, 156 (without the need for a heat-shrinkable protective sleeve). The splicing unit 100 therefore allows for a single station to be used to splice the fibers 154, 156.

Such operation shifts the burden of dimensional precision away from the fusion splicer and onto the splicing unit 100, reducing the chance of improper splicing of the fibers 154, 156. The splicing unit 100 also prevents or reduces damage to the fibers 154, 156 by reducing movement of the fibers 154, 156 between multiple stations. In some embodiments, the splicing unit 100 can be hermetically packaged to ensure cleanliness prior to splicing. One-time use of the splicing unit 100 provides a low-cost splicing option (due to the reduced skill level of the operator), and reduces maintenance and cleaning requirements. In some embodiments, the splicing unit 100 can be removed from the spliced fibers 154, 156 and reused to create another splice. The splicing unit 100 therefore provides an efficient, low-cost and low-skill option for splicing fibers 154, 156.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A single-station splicing unit, comprising:
a housing including an interior space, and at least one cover configured to be interlocked with the housing to enclose the interior space;
an alignment element removably disposed within the interior space of the housing;
a first electrode disposed on one side of the housing; and
a second electrode disposed in the housing on an opposing side from the first electrode and in a facing relationship with the first electrode;
wherein the housing is configured to receive fibers in an opposing and abutting relationship to splice the fibers;
wherein the alignment element is configured to support a cladding section of the fibers, and interlocking of the at least one cover with the housing is configured to radially secure the cladding section of the fibers against the alignment element; and
wherein the housing remains secured to the fibers after splicing.

2. The single-station splicing unit of claim 1, wherein the housing includes alignment protrusions extending from a bottom surface of the housing, and the alignment element includes complementary notches configured to engage with the alignment protrusions of the housing to orient the alignment element within the housing.

3. The single-station splicing unit of claim 1, wherein the housing includes first and second upwardly directed extensions protruding from a bottom surface of the housing, the first and second upwardly directed extensions configured to support a coated section of the respective fibers.

4. The single-station splicing unit of claim 3, wherein an uppermost point of each of the first and second upwardly directed extensions includes a groove formed therein and extending the length of the first and second upwardly directed extensions.

5. The single-station splicing unit of claim 4, wherein the groove is configured complementary to an outer diameter of the coated section of the respective fibers.

6. The single-station splicing unit of claim 1, wherein the at least one cover includes first and second covers configured to close over and crimp a coated section of the respective fibers at proximal and distal ends of the housing.

7. The single-station splicing unit of claim 6, wherein the at least one cover includes a third cover disposed between the first and second covers, the third cover configured to close over and seat the cladding section of the respective fibers within a groove formed in the alignment element.

8. The single-station splicing unit of claim 6, wherein each of the first, second and third covers is pivotably connected to a main body section of the housing with a hinge.

9. The single-station splicing unit of claim 1, wherein first and second outer walls of the housing include a slot formed therein, the slots configured to slidably receive the respective first and second electrodes.

10. The single-station splicing unit of claim 9, wherein each slot includes a first opening facing outwardly away from the interior space of the housing, and a second opening facing inwardly towards the interior space.

11. The single-station splicing unit of claim 10, wherein a body of the first and second electrodes is exposed through the first opening formed in the slots of the housing for electrical contact with contacts of a fusion splicer.

12. The single-station splicing unit of claim 10, wherein a pointed extension of the first and second electrodes extends into the interior space of the housing through the second opening formed in the slots of the housing.

13. The single-station splicing unit of claim 1, wherein the alignment element includes an elongated body with a notched area creating a space aligned with a position of the first and second electrodes.

14. The single-station splicing unit of claim 13, wherein the alignment element includes a top surface with a groove formed therein, the groove configured to receive the cladding section of the fibers.

15. The single-station splicing unit of claim 14, wherein ends of the cladding section of the fibers are configured to be positioned in an abutting relationship in the notched area of the alignment element.

16. The single-station splicing unit of claim 14, wherein the at least one cover includes an extension complementary to the groove formed in the top surface of the alignment element, the extension configured to seat the cladding section of the fibers within the groove of the alignment element.

17. A single-station splicing system, comprising:
a fusion splicer; and
a single-station splicing unit configured to be positioned within the fusion splicer, the single-station splicing unit including:
a housing including an interior space and at least one cover configured to be interlocked with the housing to enclose the interior space;
an alignment element removably disposed within the interior space of the housing;
a first electrode disposed on one side of the housing; and
a second electrode disposed in the housing on an opposing side from the first electrode and in a facing relationship with the first electrode;
wherein the housing is configured to receive fibers in an opposing and abutting relationship to splice the fibers;
wherein the alignment element is configured to support a cladding section of the fibers, and interlocking of the at least one cover with the housing is configured to radially secure the cladding section of the fibers against the alignment element; and
wherein the housing remains secured to the fibers after splicing.

18. The single-station splicing system of claim 17, wherein the fusion splicer includes a cradle configured to receive the single-station splicing unit.

19. The single-station splicing system of claim 17, wherein the fusion splicer includes electrical contacts configured to electrically connect with the first and second electrodes of the single-station splicing unit.

20. A method of splicing, comprising:
positioning a first fiber and a second fiber in an opposing and facing relationship within an interior space of a housing of a single-station splicing unit, each of the first and second fibers including a cladding section and a coated section, the single-station splicing unit including an alignment element removably disposed within the interior space, and first and second electrodes disposed on opposing sides of the housing;
positioning ends of the cladding section of the first and second fibers in an abutting relationship in the interior space of the housing with the alignment element supporting the cladding section of the first and second fibers;
interlocking a cover with the housing to enclose the cladding section of the first and second fibers within the interior space of the housing, wherein interlocking the cover with the housing radially secures the cladding section of the first and second fibers against the alignment element; and
creating a voltage arc between the first and second electrodes to splice the ends of the cladding section of the first and second fibers;
wherein the housing remains secured to the first and second fibers after splicing.

21. The single-station splicing unit of claim 1, wherein:
the housing includes a main body section defining the interior space and including first, second and third covers connected to the main body section;
each of the first, second and third covers is capable of being independently pivoted and interlocked relative to the main body section to enclose at least a portion of the interior space;
each of the fibers includes the cladding section and a coated section;
the first cover and the third cover are configured to pivot and interlock relative to the main body section over the coated section of the respective fibers to stabilize a position of the respective fibers relative to the main body section; and
the second cover is configured to pivot and interlock relative to the main body section over the cladding section of the fibers to secure the cladding section relative to the main body section.

22. The single-station splicing unit of claim 1, wherein the alignment element includes an elongated body extending between a proximal end and a distal end, the elongated body includes a central section aligned with the first and second electrodes such that the alignment element supports both of the fibers for splicing.

23. The single-station splicing unit of claim 1, wherein the housing and the alignment element are fabricated from different materials such that the alignment element has greater rigidity than the housing.

* * * * *